(12) United States Patent
Loof

(10) Patent No.: US 6,507,279 B2
(45) Date of Patent: Jan. 14, 2003

(54) COMPLETE INTEGRATED SELF-CHECKOUT SYSTEM AND METHOD

(75) Inventor: Per Olof Loof, Hillsboro Beach, FL (US)

(73) Assignee: Sensormatic Electronics Corporation, Boca Raton, FL (US)

( * ) Notice: Subject to any disclaimer, the term of this patent is extended or adjusted under 35 U.S.C. 154(b) by 6 days.

(21) Appl. No.: 09/875,483

(22) Filed: Jun. 6, 2001

(65) Prior Publication Data

US 2002/0186133 A1 Dec. 12, 2002

(51) Int. Cl.⁷ .............................. G08B 13/14
(52) U.S. Cl. .................. 340/572.1; 340/572.3; 340/568.1; 340/5.2; 705/10; 705/14; 705/16; 705/26; 705/34; 700/225; 235/350; 235/332; 235/383; 235/375
(58) Field of Search ............... 340/572.1, 572.3, 340/568.1, 5.81, 5.2, 5.92; 235/431, 385, 383, 375, 381, 376, 380, 382; 705/10, 18, 20, 21, 17, 16, 28, 26, 29, 34; 700/225

(56) References Cited

U.S. PATENT DOCUMENTS

| | | | |
|---|---|---|---|
| 3,765,007 A | 10/1973 | Elder | 340/572.3 |
| 4,071,740 A | 1/1978 | Gogulski | 235/431 |
| 4,084,742 A | 4/1978 | Silverman | 235/383 |
| 4,141,078 A | 2/1979 | Bridges et al. | 235/375 |
| 4,881,061 A | 11/1989 | Chambers | 340/572.1 |
| 4,929,819 A | 5/1990 | Collins | 235/383 |
| 5,005,125 A | 4/1991 | Farrar et al. | 705/28 |
| 5,059,951 A | 10/1991 | Kaltner | 340/572.3 |
| 5,151,684 A * | 9/1992 | Johnsen | 340/568.1 |
| 5,288,980 A | 2/1994 | Patel et al. | 235/381 |
| 5,382,779 A | 1/1995 | Gupta | 235/383 |
| 5,710,540 A | 1/1998 | Clement et al. | 340/572.4 |
| 5,777,884 A | 7/1998 | Belka et al. | 700/225 |
| 5,814,799 A | 9/1998 | Swartz et al. | 235/383 |
| 5,874,896 A | 2/1999 | Lowe et al. | 340/572.1 |
| 5,963,134 A * | 10/1999 | Bowers et al. | 340/572.1 |
| 5,963,916 A * | 10/1999 | Kaplan | 705/26 |
| 5,990,794 A | 11/1999 | Alicot et al. | 340/573.1 |
| 6,055,573 A * | 4/2000 | Gardenswartz et al. | 709/224 |
| 6,070,147 A * | 5/2000 | Harms et al. | 705/14 |
| 6,123,259 A * | 9/2000 | Ogasawara | 235/380 |
| 6,129,274 A * | 10/2000 | Suzuki | 235/381 |
| 6,327,570 B1 * | 12/2001 | Stevens | 705/7 |
| 6,169,483 B1 * | 1/2002 | Ghaffari et al. | 340/572.3 |

* cited by examiner

Primary Examiner—Benjamin C. Lee
(74) Attorney, Agent, or Firm—Rick F. Comoglio

(57) ABSTRACT

An integrated self-checkout system and method incorporates access control, electronic article surveillance (EAS), and radio frequency identification (RFID) subsystems, and allows marketing advertisements and pricing to be directed to a specific individual. The customer uses either a cell phone or an interactive personal digital assistant (PDA) when in the store, which displays prices and/or advertisements. The prices and advertisements are selected according to the customer's buying habits. The customer's buying habits are obtained by tracking the customer in the store and recording selected parameters such as the customer's track through the store, the time spent in various locations in the store, items selected by the customer, and items purchased. A database of customer habits is input to a decision program that determines the content of advertisements, and the pricing of various items. In addition to the customer's cell phone or PDA, the advertising and pricing can be communicated to the customer through shelf price displays and fixed displays strategically positioned in the store. RFID or bar code scanners are used to identify the items selected by the customer, and EAS functions can be deactivated for the specific items purchased.

20 Claims, 5 Drawing Sheets

COMPLETE INTEGRATED SELF-CHECKOUT SYSTEM AND METHOD

CROSS REFERENCES TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

This invention relates to a self-checkout system for the purchase of articles of merchandise that integrates self-checkout, access control, electronic article surveillance (EAS), and directed personal advertising subsystems.

2. Description of the Related Art

Self-checkout of articles of merchandise from controlled areas, such as retail stores, is presently implemented by gathering identification data about a selected article and correlating that data with stored inventory, pricing, and authorization or payment data. The self-checkout system may be integrated with an EAS system, so that an attached EAS tag is deactivated upon purchasing the selected article. EAS systems are well known for the deterrence of unauthorized removal of articles from a controlled area. In a typical EAS system, EAS markers or tags designed to interact with an electromagnetic field located at the exits of the controlled area are attached to articles to be protected. If an EAS tag is brought into the electromagnetic field or "interrogation zone", the presence of the tag is detected and appropriate action is taken, such as generating an alarm. For authorized removal of the article, such as a sale, the EAS tag can be deactivated to prevent detection by the EAS system.

U.S. Pat. No. 6,169,483, illustrates a self-checkout system that uses radio frequency identification (RFID) tags associated with each article to be checked out. When read by an RFID reader, RFID tags communicate detailed information about the article. RFID tags can be written to so that the stored information can be changed or augmented. Deactivation of attached EAS labels is tied to scanning and capture of the identification data associated with the article for self-checkout. Capture of the data is accomplished through the RFID tags associated with the article, or can be accomplished through the use of bar codes. The EAS label associated with the article is deactivated only after the data is captured and a valid purchase transaction has occurred. In certain systems, a single tag includes both the RFID and the EAS tags so that a separate EAS tag is not needed. In addition, in certain applications, an RFID system itself can be used to provide an EAS function. RFID sensors that read the item's RFID tag can be placed at the store's exits to identify purchased items, and allow for authorized removal without signaling an alarm.

Directed advertising to end users of certain products is presently known. For example, Iquity Systems Americas, Inc., New York, N.Y. 10006, (www.iquity.com) provides free call minutes in exchange for the user receiving advertisements on their cell phone. The advertising can be directed to groups of people on marketing lists that can be segregated according to selected demographics.

Access control systems, such as sold by Sensormatic Electronics Corporation (www.sensormatic.com), the assignee of this invention, are presently available that permit access to controlled areas only to authorized personnel. The access control can be initiated via RFID type cards issued to the authorized personnel, or using biometrics. Biometrics use physical features or characteristics, such as fingerprints, handprints, eyes, facial features, and/or voice, to recognize authorized personnel and permit entry.

There is a need for a system that integrates the above subsystems to provide an improved customer shopping experience in a self-checkout environment.

BRIEF SUMMARY OF THE INVENTION

The present invention is an integrated access control and self-checkout system and method that incorporates the following subsystems. An access control subsystem to restrict access to a controlled area, and which includes a database containing a list of authorized members. Entry to the controlled area is permitted only to an authorized member, the controlled area containing articles of merchandise for sale. A communication subsystem for communicating with the authorized member. The communication subsystem is kept with the authorized member within the controlled area and includes a display displaying information to the member. The member is tacked throughout the controlled area. Information to be displayed on the communication subsystem is determined by analyzing data stored in the database associated with the member and the location of the member within the controlled area, the data includes the purchasing habits of the member.

The system can further have the following subsystems. Article identification subsystem, such as RFID, bar code scanner or other mechanism to identify articles selected by the member for purchase. A purchase subsystem for completing a sale of articles to the member. The system may have a deactivation device to deactivate only an EAS tag associated with purchased articles. The EAS subsystem can have, at each exit of the controlled area, antennas for detecting an active EAS tag associated with the article to signal an alarm when a sale has not been completed for the article and the EAS tag has not been deactivated. Additional features of the invention are as follows.

The system can further include a display pre-positioned in the controlled area to display selected information to the member. In addition, a display adjacent the article for sale can be provided to display pricing and other selected information, the information can include information intended only for that particular member.

The system can use an RFID tag associated with the article as the EAS tag, so that a separate EAS tag is not required.

The access control subsystem can use biometrics to compare biometrics sensed from a member wanting access to the controlled area to biometrics associated with each member on the list of authorized members.

The member can be tracked by tracking the communication subsystem kept with the customer. The communication subsystem can be a cell phone, a personal digital assistant, or a pager, or an equivalent device.

The database can contain a plurality of files associated with a plurality of authorized members, each of the files can contain the purchasing habits of the associated member. The purchasing habits can include at least one of the date and time, a record of the location of the customer when in the controlled area, a time associated with the customer in the controlled area, personal data, articles selected by the member, articles purchased by the member, and usage of special offers, promotions, and coupons.

Selecting the information to be displayed can include use of a computer program that includes at least one subroutine selected from an expert system, a rule-base algorithm, an artificial neural network, and an artificial intelligence algorithm, the computer program using this information retrieved from the database.

The system can also have a dispenser for dispensing a coupon or a virtual coupon, which will respond to the purchase subsystem for competing a sale and by the analyzing information within the database.

Objectives, advantages, and applications of the present invention will be made apparent by the following detailed description of embodiments of the invention.

DETAILED DESCRIPTION OF THE INVENTION

Figure 1:
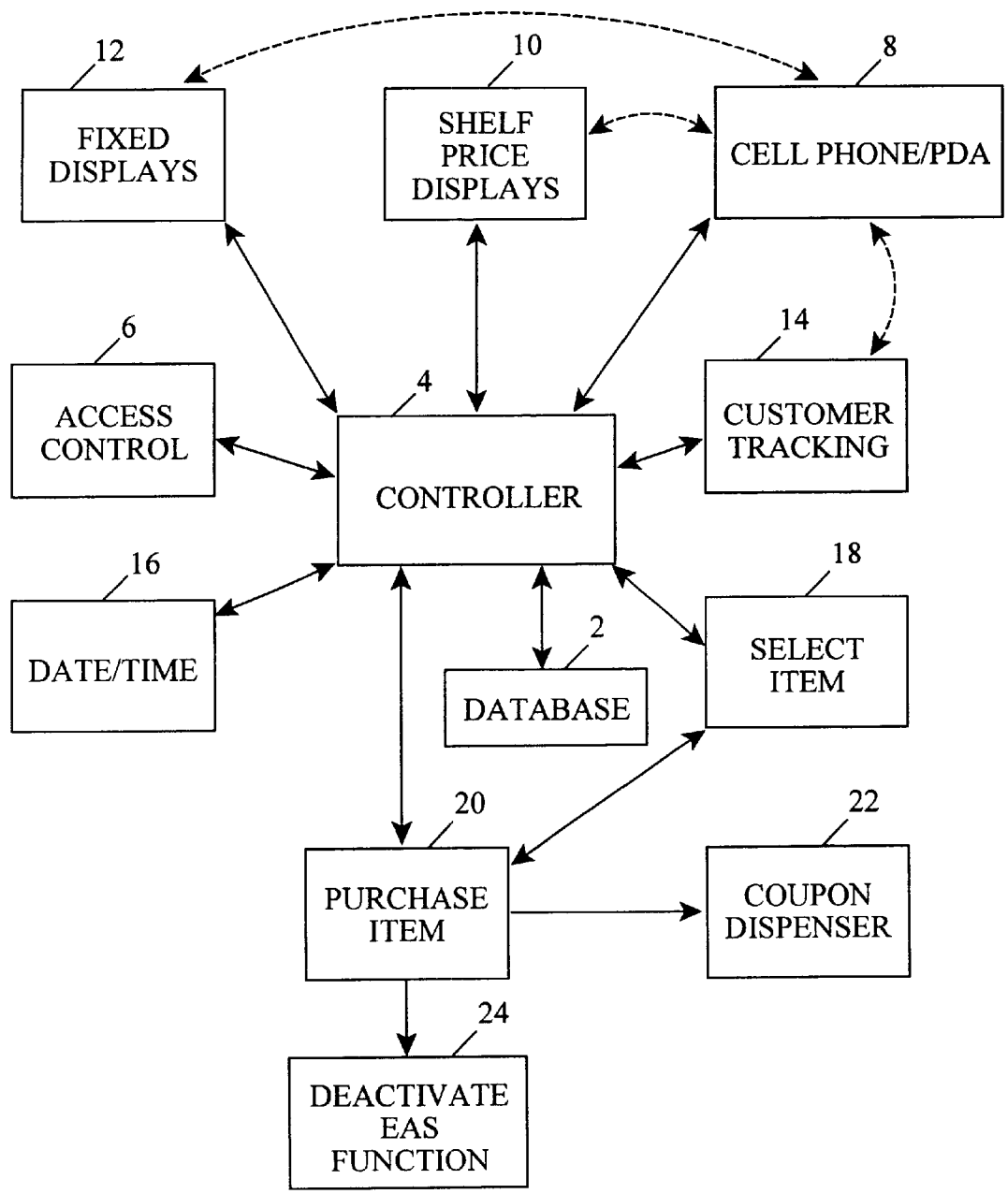
FIG. 1 is a block diagram of one embodiment of the present invention configured for a retail store.

Referring to FIG. 1, one embodiment of the present invention is illustrated for implementation in a retail store. Database 2 contains files that correspond to each customer that is permitted into the store. Controller 4 interfaces database 2 with the remaining subsystems in the invention, and provides control function as described below. Access control subsystem 6 permits store entry only for customers that are included in database 2. As known in the art, access control 6 can be implemented via an access control identification card or through the use of biometrics. Each customer permitted access to the store will have a cell phone, a pager, personal digital assistant (PDA), or other device 8, which receives custom advertisements and pricing information directed to that specific customer via a wireless communication link. A PDA is a small handheld computer, and can include a wireless modem for interconnection to the Internet and/or a communication network, similar to a cell phone or pager, for sending and receiving messages. The term "PDA" is used herein to refer to PDA's, cell phones, pagers, and similar communication devices. The wireless communication link can be via a conventional cell phone signal, or a wireless local area network (LAN) protocol, or other communication protocol, such as, but not limited to, Bluetooth communication, IEEE 802.11 a/b, or infrared link. In addition, shelf price displays 10 will receive price, and/or custom advertisements for the specific customer carrying cell phone/PDA 8. Any number of fixed displays 12 can also be positioned in strategic locations within the store. Activation of the shelf displays 10 and fixed displays 12 are determined by the location of the customer in the store as determined by customer tracking 14. Customer tracking 14 can be accomplished by tracking the customer's cell phone or PDA 8. Cell phone tracking can be accomplished using a method similar to the known method of pinpointing the location of a cell phone for the E-911 service, which locates the position of a cell phone used to call 911. The position of the cell phone is determined by triangulating the cell phone signal, or by equipping the cell phone with a GPS satellite receiver. To track a PDA, the PDA can be configured to be in communication with shelf displays 10 and/or fixed displays 12, which can be used to pinpoint the location of the customer in the store. The shelf price displays 10 and fixed displays 12 can display relevant advertisements for a particular customer and will be activated as that customer passes the shelf display 10 or fixed display 12.

The content displayed upon the customer's cell phone/PDA 8, the shelf price displays 10, and the fixed displays 12 is determined by analyzing information contained in the customer's file contained in database 2, which constitutes the customer's purchasing habits as fully described hereinbelow. The customer's file includes a record of the customer tracking data 14 correlated to date and time 16. Items that the customer selects from the store's shelves 18 are also recorded. Items selected 18 may be added to the customer's cart for purchase or the item's label may be read and the item returned to the shelf. The customer can also request additional information about the item, which can be displayed on the cell phone/PDA 8. Preferably, the store is equipped with an RFID system to monitor shelf items selected 18, alternately, bar code scanning can be used to monitor the selected shelf items. For example, the PDA 8 could include a wireless bar code scanner to scan items selected. The PDA 8 can be the customer's, which is specially configured to be used with the present invention, or the store can provide a properly configured PDA for the customer's use upon entry into the store.

If the item selected is purchased 20, a coupon dispenser 22 can be activated to generate coupons selected for the specific customer. The EAS function must also be deactivated 24 for purchased items. The deactivation can be performed locally, at the shopping cart, or in a central location. The EAS function can be performed by having an EAS tag attached to each item, which will set off an alarm if not deactivated prior to exiting the store. Alternately, if the store is RFID equipped, the RFID tag attached to each item can be used for the EAS function and a separate EAS tag is not needed. If an RFID tagged item is purchased, that information can be communicated to controller 4, which will then prevent an alarm if that item is carried out of the store. Purchase information for that item can also be written directly to the RFID tag to designate that the item has been sold, as known in the art.

Figure 2:
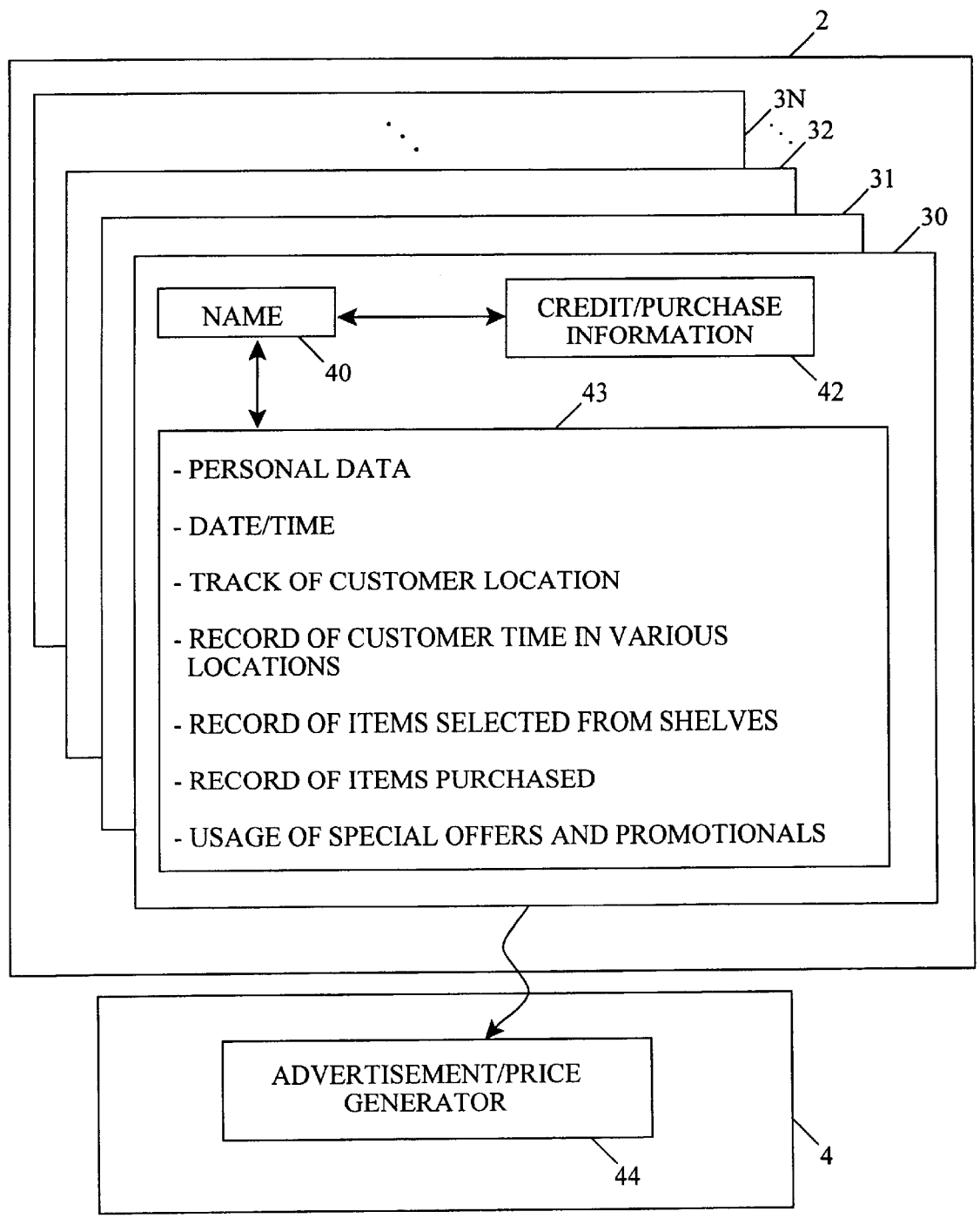
FIG. 2 is a block diagram of one embodiment of a portion of the database shown in FIG. 1.

Referring to FIG. 2, database 2 contains customer files 30, 31, 32, . . . 3N, where N is an integer to designate that any number of files could be entered. Each customer file 30 contains, for example, the customer name 40, credit and purchase information 42, and relevant information consisting of the customer's buying habits 43. Credit and purchase information 42 can be any selected method of payment, such credit card, store credit, checking account debit, or other method or combination of methods for payment. Buying habits 43 can include, but is not limited to, personal data about the customer, such as physical, gender, chronological, and social data and personal preferences, date and times of shopping, a track of the customer's location in the store and the amount of time spent in various locations. A record of items selected from the shelves, and whether additional information was requested, a record of purchases, and a record of usage of special offers, promotions and coupons. The combination of the above parameters, and/or other parameters, is defined as the customer's buying habits, and is input to the advertisement/price generator 44, which can be part of controller 4, as fully described below.

Figure 3:
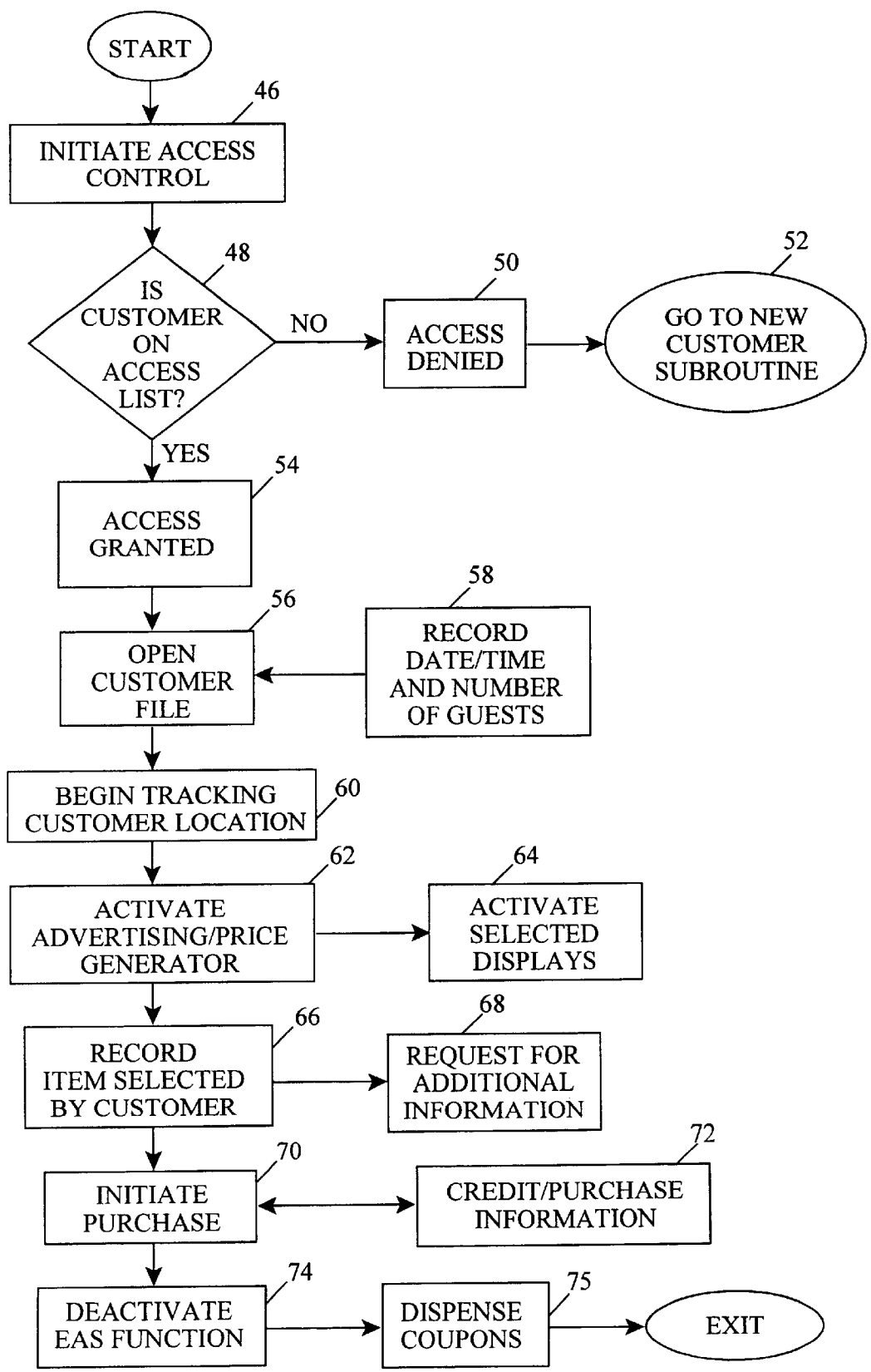
FIG. 3 is a flow diagram illustrating the operation of one embodiment of the present invention.

Referring to FIG. 3, when a customer attempts to enter the store, the access control system must be initiated at 46. The customer can present an identification card, which can be read by an RF or magnetic field, or if biometrics are implemented, the customer's'may present the appropriate hand, finger, eye, voice, or the like for sensing by optics, acoustics, or laser, and/or the customer's facial features may be sensed. If the customer is not on the access list at 48, access is denied at 50, and the customer is directed to a new customer subroutine 52, further described below. The customer can enter required data and be added to the access list. Once added to the access list, the customer essentially becomes a member of the store and can enter the store in the future quickly and easily. The access list is the list of names 40 that have database, entries 30–3N, as shown in FIG. 2.

If the customer is on the access list, access is granted at 54, and the customer's file, 30–3N, is opened at 56 for logging in new information associated with the current store visit to add to the database of the customer's buying habits. The date and time are recorded, and an entry is made as to how many guests, if any, are accompanying the customer at 58. Substantially immediately upon store entry, tracking of the customer beings at 60 and the advertising/price generator is activated at 62, as further described below. Displays are activated at 64 according to the location of the customer in the store. The advertising/price generator 44, as shown in FIG. 2 and further described below, selects the content of the activated displays. Items selected from the shelves by the customer are recorded at 66. Selected items can be monitored using RFID tags and RFID readers located so that the RFID tags on the items selected are automatically read by an RFID reader, and recorded. Alternately, it the store is not RFID equiped, bar code scanners can be used to identify items selected by the customer. Bar code scanners can be positioned on, or adjacent the shelves, in shopping carts, or as an attachment or part of the customer's PDA. If the customer requests additional information about the selected product, the request is recorded at 68. Requesting additional information can be via a request sent by the customer on the cell phone or PDA 8, or on other sites fixed in the store. The delivery of additional information can be immediately displayed on the customer's cell phone or PDA 8, or delivered to the customer's home, office, another computer, or other selected location. For example, the customer can request information and be linked directly to a product manufacture's website, which can be displayed on the customer's cell phone right in the store.

The customer may decide to purchase certain selected items at 70, at which point the customer's credit and purchase information 42, as shown in FIG. 2, is retrieved at 72. The customer will have an opportunity to select an alternate payment method, such as cash. Once the purchase is approved the EAS function is deactivated at 75. If the store is equipped with a separate EAS system, deactivation of the EAS function means deactivation of the EAS tag associated with each item purchased. Alternately, if the store is equipped with an RFID system that also performs EAS functions, deactivation of the EAS function means deactivation of the EAS function associated with the RFID tag attached to each item purchased. This may include writing to the RFID tag, or indicating to the EAS system not to alarm if that particular RFID tag is carried out of the store. Deactivation can be performed for an entire shopping cart full of selected items either by having an EAS deactivator installed in the shopping car, or by placing the shopping cart into a suitable electromagnetic field to deactivate the EAS tags. Alternately, selected locations in the store can be set to deactivate the selected items individually, or in groups, such as when the items are placed into a shopping bag, as shown in U.S. Pat. No. 5,990,794.

Figure 4:
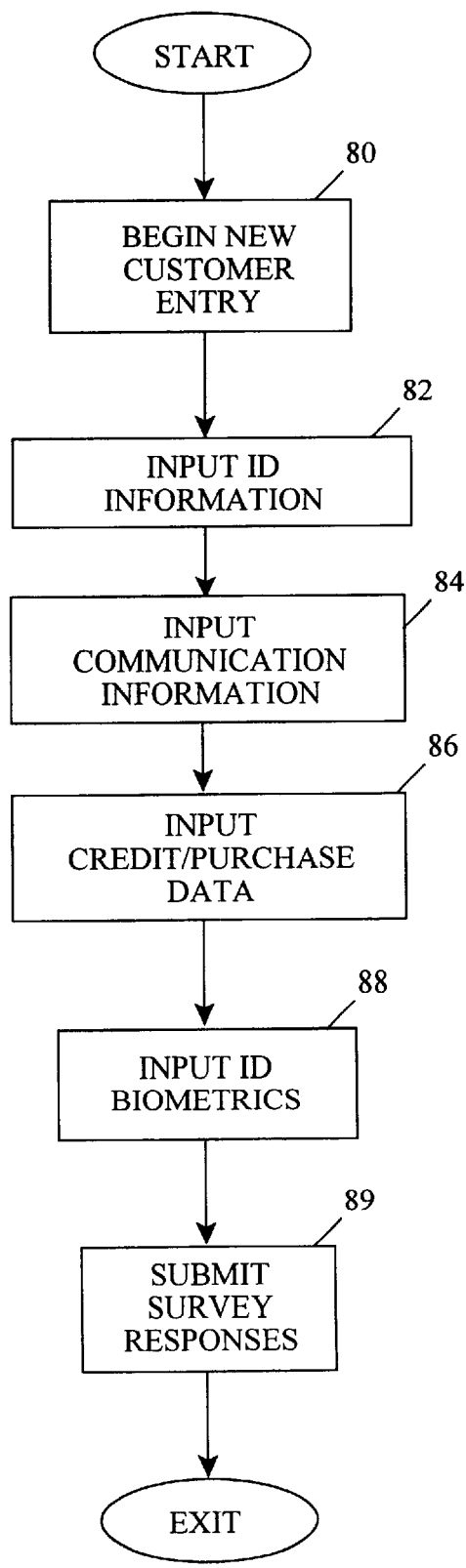
FIG. 4 is a flow diagram illustrating a portion of that shown in FIG. 3.

Referring to FIG. 4, after a customer is denied access and directed to a new customer subroutine at 50 and 52, respectively, in FIG. 3, the customer may elect to become a member of the store and begin a new customer entry at 80. The following customer entries can be in any selected order, the order being merely a programming decision. The customer will enter identification information at 82, such as name, address, email address, and the like. The customer will enter communication information at 84, which will include the customer's cell phone, pager, or interactive PDA number to be used within the store. If the customer does not have a cell phone, pager, or PDA, upon entering the store, the customer will be loaned a suitable communication device for use within the store. The customer will enter credit and purchase information at 86, which will include the customer's preferred method of payment and may be a credit card number, store credit application, checking account number for debit transactions, and the like. If biometrics are used for access control, the customer will enter sample biometrics to establish a baseline for the customer to be recognized in the future. Optionally, the customer may enter survey question results at 89. The survey questions will pertain to personal preferences related to marketing and shopping, and can be used to establish a starting point for the customers buying habits 43 as an initial input to the advertising/price generator 44.

Figure 5:
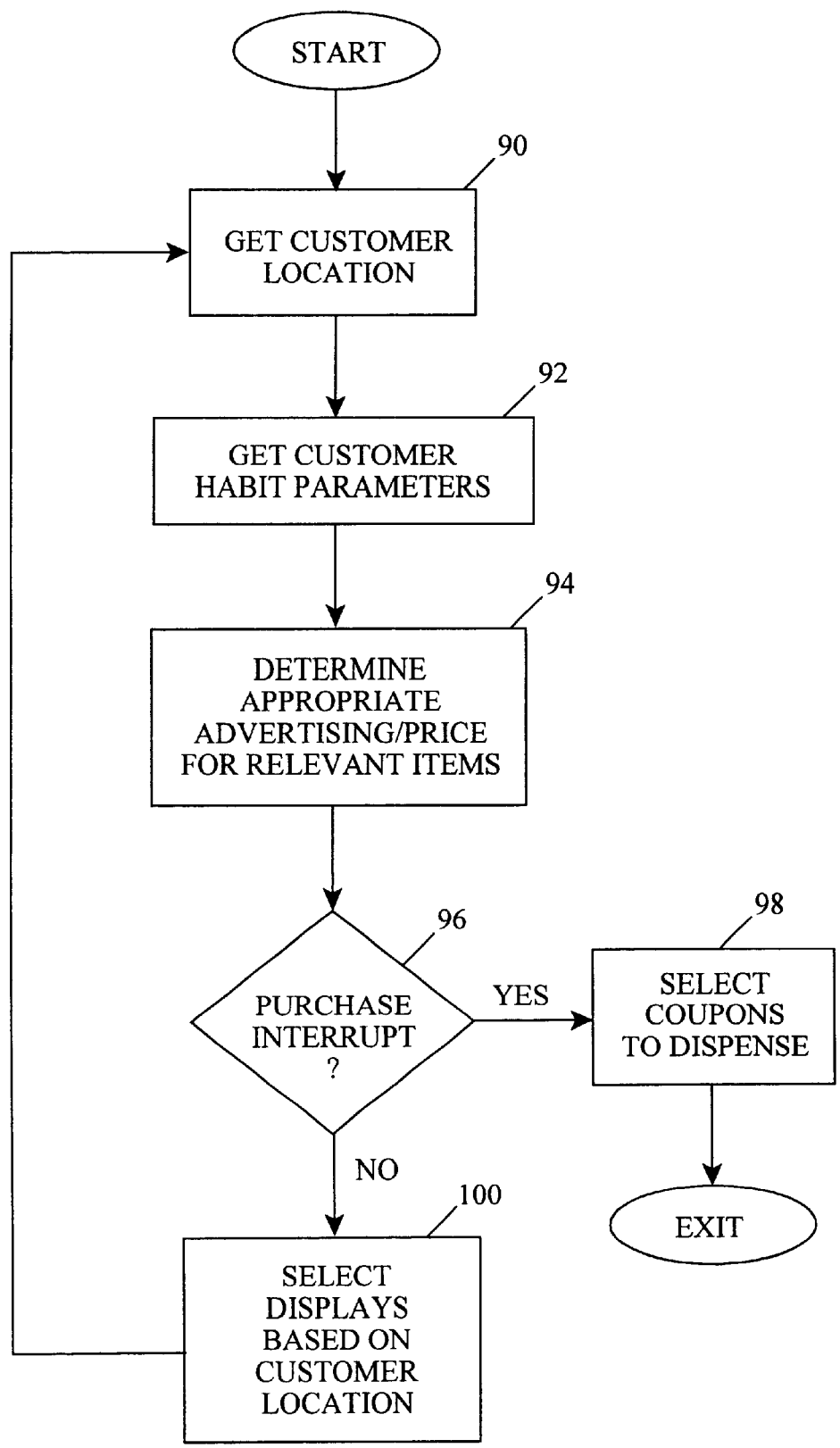
FIG. 5 is a flow diagram illustrating one embodiment for operation of the advertising generator shown in FIG. 3.

Referring to FIG. 5, operation of one embodiment of the advertising/pricing generator 44, shown in FIG. 2, is illustrated. From database 2, the customer's current location is obtained at 90, and the customer's buying habit parameters are obtained at 92. At 94, the customer's buying habits 43 and present location are used to determine appropriate prices and advertisements for items in the vicinity of the customer for display on the shelf displays 10, the fixed displays 12, and the customer's cell phone or PDA 8, shown in FIG. 1.

If a purchase interrupt is not received at 96, the selected advertising and pricing information is displayed on the selected displays at 100. The displayed pricing and advertising will be directed only to the particular customer, and may include addressing that customer by name. The displays can include synthesized speech so that the customer may be spoken to by the displays or via the customer's cell phone. The decision as to what pricing and advertising is selected is based upon the customer's buying habits 43, and can be implemented in a very simple manner or in a complex manner. For example, the customer's prior purchases can be simply correlated to the customer's present location. Pricing can be standard, storewide pricing for each item, with discounts for previously purchased item types. Or any number of similar marketing schemes can be implemented. A more complex implementation can include a complex analysis program, such as an expert system, or other rule-based program, or an artificial intelligence program such as an artificial neural network, which uses the customer's buying habits to determine suitable advertisements and prices. The system can start with a very simple decision on pricing and advertising, and increase the complexity of the decision process as the program learns about the customer by the customer shopping and filling the database with more and more information. The information contained within database can also be used to anticipate possible future purchases, forecast inventory requirements, and as a valuable marketing list of customers whose buying habits are precisely known.

If a purchase interrupt is received at 96, selected coupons may be dispensed for that particular customer at 98. The coupons are selected in a similar manner to that described above for selection of appropriate advertising and pricing. The coupons could be actual paper coupons, or virtual coupons or credits for redemption on particular items, and possibly within selected timeframes.

It is to be understood that variations and modifications of the present invention can be made without departing from the scope of the invention. It is also to be understood that the scope of the invention is not to be interpreted as limited to the specific embodiments disclosed herein, but only in accordance with the appended claims when read in light of the forgoing disclosure.

What is claimed is:

1. An integrated access control and self-checkout system, comprising:
    means for restricting access to a controlled area, said means including a database containing a list of authorized members and permitting entry only to an authorized member, the controlled area containing articles of merchandise for sale;
    communication means for communicating with the authorized member, said communication means disposed with each authorized member within the controlled area and including a display means for displaying information to the member;
    tracking means for tracking the member throughout the controlled area; and,
    means for selecting information to be displayed on said communication means by analyzing data in said database associated with the member and the location of the member within the controlled area, said data including purchasing habits of the member.
2. The system of claim 1 further comprising:
    means for identifying an article selected by the member for purchase; and,
    means for completing a sale of said article to the member.
3. The system of claim 2 further comprising:
    means for deactivating an EAS tag associated only with said article; and,
    means, at each exit of said controlled area, for detecting an active EAS tag associated with said article to signal an alarm when a sale has not been completed for said article and said EAS tag has not been deactivated.
4. The system of claim 3 wherein said means for identifying an article selected by the member for purchase comprises an RFID tag associated with said article, wherein said RFID tag is also said EAS tag.
5. The system of claim 2 wherein said means for identifying an article selected by the member for purchase comprises an RFID tag associated with said article.
6. The system of claim 2 further comprising dispensing means for dispensing a coupon, said dispensing means responsive to said means for competing a sale and said means for selecting information wherein coupons are selected based upon said database and are dispensed only after a competed sale.
7. The system of claim 1, further comprising a display pre-positioned in said controlled area to display selected information to the member.
8. The system of claim 1 further comprising a display adjacent said article for sale, to display pricing and other selected information, said information including information intended only for the member.
9. The system of claim 1 wherein said means for restricting access comprises comparing biometrics sensed from a member wanting access to the controlled area to biometrics associated with each member on the list of authorized members.
10. The system of claim 1 wherein said tracking means comprises tracking of said communication means.
11. The system of claim 1 wherein said database comprises a plurality of files associated with a plurality of authorized members, each of said files containing the purchasing habits of the associated member, said purchasing habits including at least one of the items selected from the group containing the date and time, a record of the location of the customer when in the controlled area, a time associated with the customer in the controlled area, personal data, articles selected by the member, articles purchased by the member, and usage of special offers.
12. The system of claim 11 wherein said means for selecting information to be displayed comprises a computer program that includes at least one subroutine selected from the group containing an expert system, a rule-base algorithm, an artificial neural network, and an artificial intelligence algorithm, said computer program using information retrieved from said database.
13. The system of claim 1 wherein said means for communication is selected from the group containing a cell phone, a personal digital assistant, and a pager.
14. A method for operating an integrated self-checkout store, comprising:
    restricting access to a controlled area, including accessing a database containing a list of authorized members and permitting entry only to an authorized member, the controlled area containing articles of merchandise for sale;
    communicating with the authorized member within the controlled area and including displaying information to the member;
    tracking the member throughout the controlled area; and,
    selecting information to be displayed to the member by analyzing data in said database associated with the member and the location of the member within the controlled area, said data including purchasing habits of the member.
15. The method of claim 14 further comprising:
    identifying an article selected by the member for purchase; and,
    completing a sale of said article to the member.
16. The method of claim 15 further comprising:
    deactivating an EAS tag associated only with said article; and,
    detecting an active EAS tag associated with said article to signal an alarm when a sale has not been completed for said article and said EAS tag has not been deactivated.
17. The method of claim 15 further comprising, after completing said sale, dispensing a coupon selected based upon said selecting of information to be displayed and said database.
18. The method of claim 14, further comprising displaying selected information to the member in a pre-selected location in the controlled area.
19. The method of claim 14 further comprising displaying pricing and other selected information adjacent said article for sale, said information including information intended only for the member.
20. The method of claim 14 wherein restricting access to the controlled area further comprises comparing biometrics sensed from a member wanting access to the controlled area to biometrics associated with each member on the list of authorized members.

* * * * *